United States Patent
Takagi et al.

(10) Patent No.: US 11,456,689 B2
(45) Date of Patent: Sep. 27, 2022

(54) DRIVING DEVICE, DRIVING SYSTEM, AND METHOD OF DRIVING ELECTRIC MOTOR

(71) Applicants: KABUSHIKI KAISHA TOSHIBA, Minato-ku (JP); Toshiba Electronic Devices & Storage Corporation, Minato-ku (JP)

(72) Inventors: Takashi Takagi, Kawasaki (JP); Toshimitsu Aizawa, Yokohama (JP); Shen Wang, Yokohama (JP)

(73) Assignees: KABUSHIKI KAISHA TOSHIBA, Minato-ku (JP); Toshiba Electronic Devices & Storage Corporation, Minato-ku (JP)

(*) Notice: Subject to any disclaimer, the term of this patent is extended or adjusted under 35 U.S.C. 154(b) by 205 days.

(21) Appl. No.: 16/725,000

(22) Filed: Dec. 23, 2019

(65) Prior Publication Data
US 2020/0295687 A1 Sep. 17, 2020

(30) Foreign Application Priority Data
Mar. 14, 2019 (JP) .............................. JP2019-046828

(51) Int. Cl.
*H02P 21/00* (2016.01)
*H02P 21/09* (2016.01)
(Continued)

(52) U.S. Cl.
CPC .............. *H02P 21/09* (2016.02); *H02P 21/18* (2016.02); *H02P 21/22* (2016.02); *H02P 27/12* (2013.01)

(58) Field of Classification Search
CPC .......... H02P 23/02; H02P 21/22; H02P 23/14; H02P 21/09; H02P 27/12; H02P 25/022; H02P 21/18
(Continued)

(56) References Cited

U.S. PATENT DOCUMENTS

| 5,796,228 A | * | 8/1998 | Kojima | .................... H02P 25/03 |
| | | | | 318/605 |
| 7,564,206 B2 | * | 7/2009 | Oomura | .................. H02P 21/22 |
| | | | | 318/400.26 |

(Continued)

FOREIGN PATENT DOCUMENTS

| JP | 2005-137163 | 5/2005 |
| JP | 2007-267576 A | 10/2007 |

(Continued)

*Primary Examiner* — Kawing Chan
*Assistant Examiner* — Gabriel Agared
(74) *Attorney, Agent, or Firm* — Oblon, McClelland, Maier & Neustadt, L.L.P.

(57) ABSTRACT

According to one embodiment, a driving device includes a voltage controller, a parameter setter, and a phase adjuster. The voltage controller causes an electric power converter to apply a drive voltage to the electric motor, the electric power converter converting input electric power to A/C electric power having desired voltage and frequency and supplying the converted electric power to an electric motor. The parameter setter sets at least one of a rotation speed of the electric motor and a parameter related to the rotation speed as speed information. The phase adjuster adjusts a phase of the drive voltage in such a manner that an index calculated based on a current flowing in the electric motor and the speed information set in the parameter setter becomes smaller.

9 Claims, 4 Drawing Sheets

(51) Int. Cl.
*H02P 27/12* (2006.01)
*H02P 21/22* (2016.01)
*H02P 21/18* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 7,671,552 | B2* | 3/2010 | Tonami | ................... B66B 1/308 |
| | | | | 318/432 |
| 8,174,220 | B2* | 5/2012 | Inoue | ..................... B60L 50/16 |
| | | | | 318/400.02 |
| 2005/0093520 | A1* | 5/2005 | Muramatsu | ............ H02K 29/08 |
| | | | | 322/29 |
| 2006/0055352 | A1* | 3/2006 | Mori | ........................ H02P 6/18 |
| | | | | 318/432 |
| 2007/0013333 | A1 | 1/2007 | Ajima et al. | |
| 2009/0189555 | A1* | 7/2009 | Chen | ....................... H02P 27/08 |
| | | | | 318/400.07 |
| 2014/0070745 | A1 | 3/2014 | Hirono | |
| 2015/0054437 | A1 | 2/2015 | Oomura et al. | |
| 2018/0183365 | A1* | 6/2018 | Kurosawa | ............... H02P 6/157 |

FOREIGN PATENT DOCUMENTS

| | | |
|---|---|---|
| JP | 2008-160912 A | 7/2008 |
| JP | 4847060 B2 | 12/2011 |
| JP | 2012-44775 A | 3/2012 |
| JP | 2012-244670 | 12/2012 |
| JP | 2015-33310 A | 2/2015 |
| JP | 2015-62329 A | 4/2015 |
| JP | 5748051 B2 | 7/2015 |
| JP | 2017-38444 | 2/2017 |
| JP | 2019-151005 A | 9/2019 |

\* cited by examiner

DRIVING DEVICE, DRIVING SYSTEM, AND METHOD OF DRIVING ELECTRIC MOTOR

CROSS-REFERENCE TO RELATED APPLICATIONS

This application is based upon and claims the benefit of priority from Japanese Patent Application No. 2019-046828, filed Mar. 14, 2019, the entire contents of which are incorporated herein by reference.

FIELD

Embodiments relate to a driving device, a driving system, and a method of driving an electric motor.

BACKGROUND

A synchronous electric motor using a permanent magnet is widely popular as an electric motor in the quest for achieving high efficiency, etc. of a driving system of the electric motor. In a driving system in which a synchronous electric motor, etc. is used as an electric motor, driving control for improving efficiency of the electric motor is demanded. One example of driving control of an electric motor involves a method of adjusting a drive voltage applied to the electric motor based on a phase of an induced voltage of an electric motor and a phase of a current flowing in the electric motor. With this driving control, a phase of the drive voltage is adjusted in such a manner that a phase of an induced voltage and a phase of a flowing current come to match, thereby achieving high efficiency of the motor. As another example of the driving control of the electric motor, there exists a method of adjusting a phase of the drive voltage applied to the electric motor in such a manner that a current flowing in the motor decreases, thereby achieving high efficiency of the motor.

In the above-described driving system of the electric motor, if either the torque control of an output torque of the motor or the speed control of the rotation speed of the motor is performed, the circuit configuration of the driving system and the processing in the driving system become complicated. For this reason, the driving control of the electric motor that achieves high efficiency of the electric motor even without the above torque and speed controls, is demanded.

DETAILED DESCRIPTION

According to an embodiment, a driving device includes a voltage controller, a parameter setter, and a phase adjuster. The voltage controller causes an electric power converter to apply a drive voltage to the electric motor by controlling an operation of the electric power converter that converts input electric power to A/C electric power having desired voltage and frequency and that supplies the converted electric power to an electric motor. The parameter setter sets at least one of a rotation speed of the electric motor and a parameter related to the rotation speed as speed information. The phase adjuster adjusts a phase of the drive voltage in such a manner that an index calculated based on a current flowing in the electric motor and the speed information set in the parameter setter becomes smaller.

According to the embodiment, the driving system including the above-described driving device, an electric power converter, and an electric motor is provided. The electric power converter applies a drive voltage to the electric motor.

The embodiment provides a method of driving the electric motor. According to the driving method, input electric power is converted into A/C electric power having desired voltage and frequency by the electric power converter, and the converted A/C electric power is supplied to the electric motor. Further according to the driving method, a current flowing in the electric motor is detected. In the method, at least one of a rotation speed of the electric motor and a parameter related to the rotation speed is set as speed information. In the method, a phase of a drive voltage applied to the electric motor by the electric power converter is adjusted in such a manner that an index calculated based on the detected current and the set speed information becomes smaller.

Hereinafter, embodiments will be described with reference to the accompanying drawings.

First Embodiment

Figure 1:
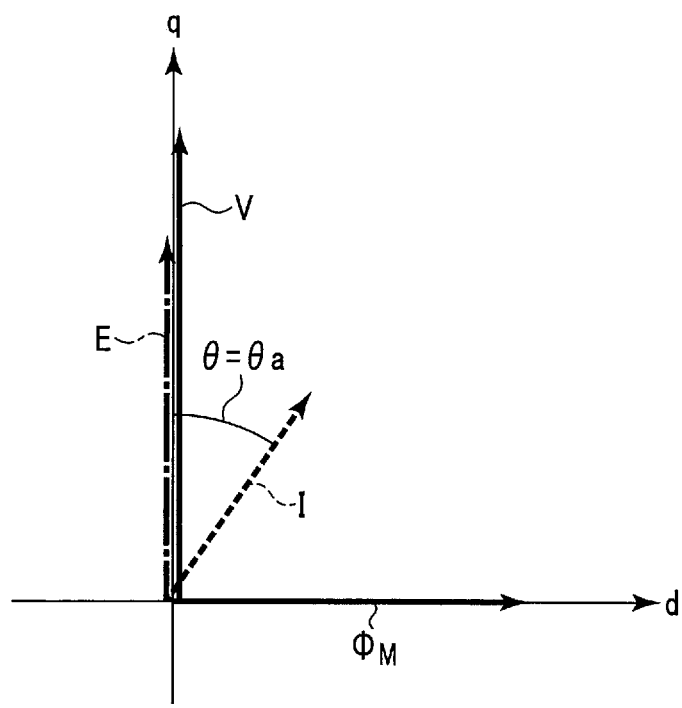
FIG. 1 is a schematic diagram showing an example of a vector diagram of an electric motor.
Figure 2:
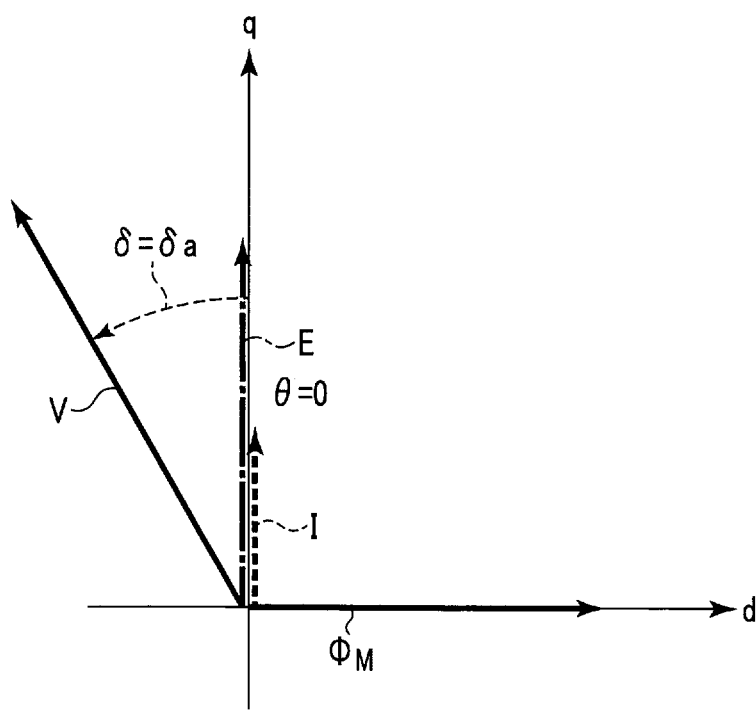
FIG. 2 is a schematic diagram showing a vector diagram of the electric motor when a phase of a drive voltage vector leads a phase of an induced voltage vector compared to the situation shown in FIG. 1.

First, a parameter related to the drive control of the electric motor will be described. FIGS. 1 and 2 are vector diagrams of the electric motor in which a permanent magnet is used. Each of FIGS. 1 and 2 is a diagram of vectors in a coordinate system defined by a d-axis which represents the direction of an action of a magnetic flux vector $\Phi_M$ belonging to a rotator of the electric motor, and a q-axis which is orthogonal to the d-axis. In each of FIGS. 1 and 2, in addition to the magnetic flux vector $\Phi_M$, a vector of a drive voltage V applied to the electric motor by the electric power converter (inverter), a vector of an induced voltage E of the electric motor, and a vector of a current I flowing in the electric motor are shown.

In the situation shown in FIG. 1, the drive voltage V is applied to the electric motor in such a manner that the vector of the drive voltage V has the same phase as the vector of the inducted voltage E. In this case, the phase difference θ between the inducted voltage vector E and the current vector I is θa. For this reason, the current vector I is behind the induced voltage vector E by the phase difference θa.

In the situation shown in FIG. 2, the drive voltage V is applied to the electric motor, in a state in which the phase of the vector of the drive voltage V leads the phase of the induced voltage vector E by a phase δa. In the situation shown in FIG. 2, the phase shift amount of the drive voltage from the situation shown in FIG. 1 becomes a phase δa. In this case, as the drive voltage vector V leads the induced voltage vector E by a phase δa, the current vector I of the electric motor has the same phase as the induced voltage vector E. As a result, the phase difference θ of the current vector I from the induced voltage vector E becomes zero.

Herein, the output torque $\tau_M$ in the electric motor, such as a surface magnetic electric motor, etc., can be written as the expression (1) below, using a number of pole pairs P, the current I, and the phase difference θ. In the expression (1), the magnetic flux $\Phi_M$ of the electric motor and the current I flowing in the electric motor are expressed as a scalar quantity.

$$\tau_M = P \cdot \Phi_M \cdot I \cdot \cos\theta \qquad (1)$$

If the output torque $\tau_M$ is constant, according to the expression (1), cosθ should be maximized and the current I flowing in the electric motor should be lowered so that high efficiency of the electric motor can be achieved. In this case, the phase difference θ of the current I with respect to the induced voltage E is reduced to zero by controlling the phase of the drive voltage V through, for example, shifting the phase of the drive voltage V applied to the electric motor, similarly to the change from the situation shown in FIG. 1 to the situation shown in FIG. 2.

For example, suppose the control to adjust the phase of the driving voltage V is performed using only the current I of the electric motor as an index, in such a manner that the current I of the electric motor becomes smaller. In the foregoing control using the current I as an index, if the output torque $\tau_M$ is held down to a constant value, in other words, the control is performed so as to maintain the output torque $\tau_M$ at a constant value, the phase difference θ easily converges to zero and cosθ converges into one, through the adjustment of the phase of the drive voltage V.

However, there is a case where neither the torque control in which the output torque $\tau_M$ of the electric motor is maintained at a constant value, nor the speed control in which the rotation angular speed (rotation speed) ω is controlled to be a constant value is performed from the viewpoint of simplifying the circuit configuration of the driving system and the process in the driving control, etc. In this case, the current I is lowered regardless of the convergence of cosθ into 1, even if the phase of the drive voltage V is adjusted so as to lower the current I as an index through the above-described control using the current I as an index. For this reason, high efficiency of the electric motor fails to be achieved.

Then, suppose the control is performed whereby an index εa indicated in the expression (2) is set instead of the current I. The index εa is a ratio of the current I to the output torque $\tau_M$.

$$\varepsilon a = \frac{I}{\tau_M} = \frac{I}{P \cdot \Phi_M \cdot I \cdot \cos\theta} \propto \frac{1}{\cos\theta} \qquad (2)$$

In the expression (2), the number of pole pairs P of the electric motor and the magnetic flux $\Phi_M$ of the electric motor are constants unique to the electric motor. For this reason, the index εa is a function wherein only the phase difference θ is a variable. Accordingly, even in the above-described driving control in which the foregoing torque control and speed control are not performed, cosθ converges to 1 through adjusting the phase of the drive voltage V in such a manner that the index εa becomes smaller (minimized). In other words, even if the output torque $\tau_M$ changes as a result of the torque control not being performed, etc., the phase difference θ converges to zero through the above-described control using the index εa. Accordingly, even under a condition where the output torque $\tau_M$ changes, high efficiency of the electric motor is achieved.

However, as shown in the expression (2), etc., the output torque $\tau_M$ is a parameter calculated through the use of the current I and the magnetic flux $\Phi_M$, and there is a case where the output torque $\tau_M$ cannot be obtained, depending on the configuration etc. of the driving system of the electric motor. In this case, the above-described index εa cannot be set. Then, the equation of motion regarding the electric motor, which is shown below as an expression (3), is considered. The expression (3) shows the inertia constant M of the electric motor, the rotation angular velocity ω of the electric motor, the output torque $\tau_M$ of the electric motor, and the load torque $\tau_L$ of the electric motor. In addition, the expression (3) gives a torque difference Δτ between the output torque $\tau_M$ and the load torque $\tau_L$.

$$M \frac{\delta\omega}{\delta t} = \tau_M - \tau_L (= \Delta\tau) \qquad (3)$$

Herein, the expression (3) is deformed through performance of time integration, etc. on the expression (3) with the interval [0, Ts], so that the expression (3) indicates change of the rotation angular velocity ω with time in any given control cycle Ts. The expression (4) is thereby obtained. The expression (4) shows a velocity deviation Δω of the rotation angular velocity ω in the control cycle Ts. The index ε which is obtained by replacing the output torque $\tau_M$ of the index εa shown in the expression (2) with the rotation angular velocity ω is shown as the expression (5) below.

$$\Delta\omega = \frac{T_s}{M} \cdot \Delta\tau \qquad (4)$$

$$\varepsilon = \frac{I}{\omega} \qquad (5)$$

In the expression (4), the control cycle Ts and the inertia constant M are constants. Thus, the velocity deviation Δω is proportional to the torque deviation Δτ. For this reason, the index ε shown in the expression (5) can be treated as an index equivalent to the index εa shown in the expression (2). Accordingly, it is possible to perform the same control as the above-described driving control based on the index εa, even if the index ε of the expression (5) is used. Similarly to the above-described driving control based on the index εa, even in the driving control in which the torque control and the speed control are not performed, cosθ converges to 1 through adjusting the phase of the drive voltage V in such a manner that the index ε becomes smaller (minimized). In other words, high efficiency of the electric motor is achieved through the control based on the index ε, even under a condition where the output torque $\tau_M$ changes.

Figure 3:
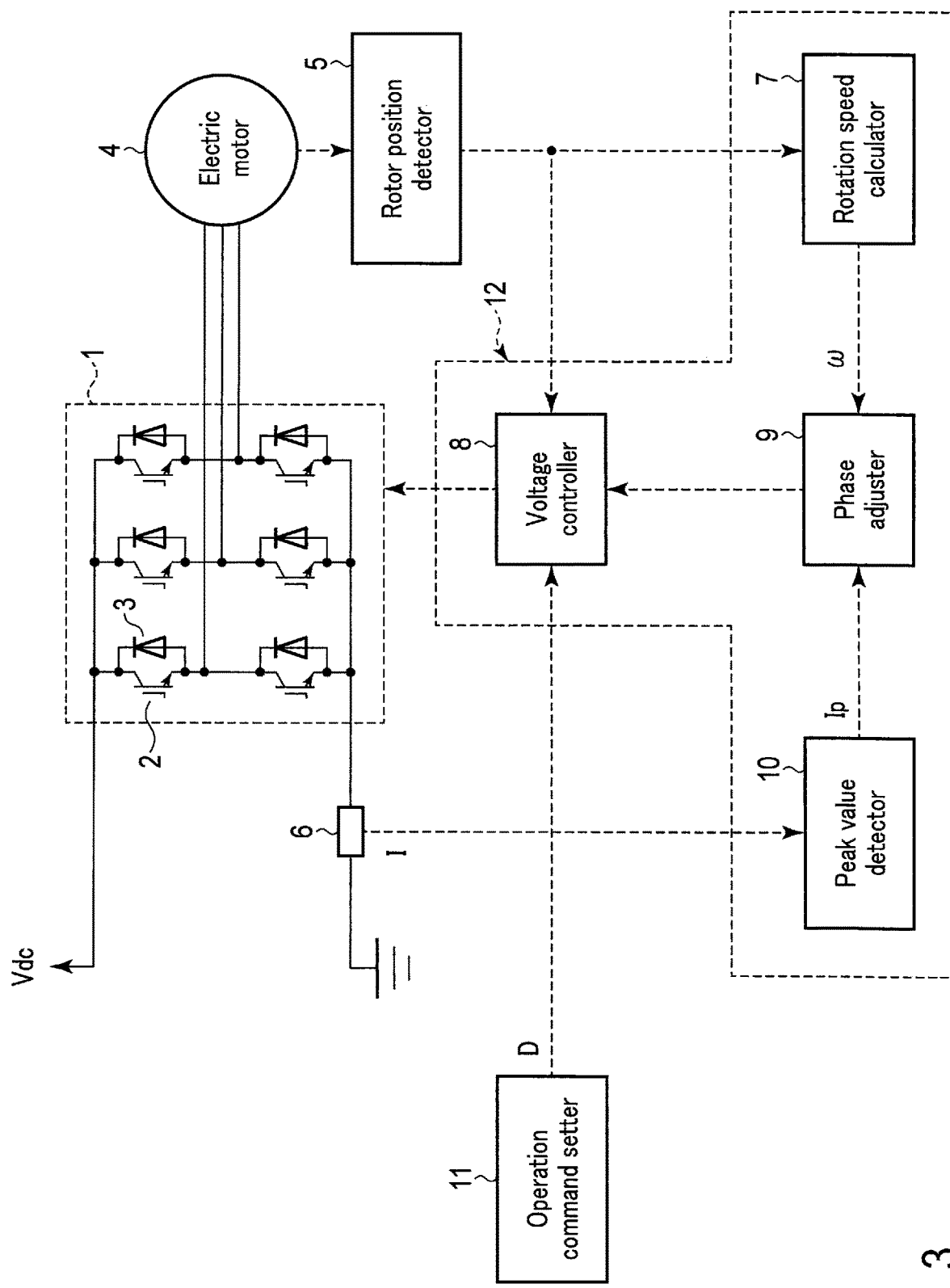
FIG. 3 is a schematic diagram showing an example of a driving device and a driving system according to a first embodiment.

Hereinafter, a driving device that performs the above-described control based on the index ε, and a driving system including the driving device and an electric motor will be described. FIG. 3 is a schematic diagram showing an example of a driving device and a driving system according to the present embodiment. The driving system has an electric motor 4 and a driving device for the electric motor 4. In the example shown in FIG. 3, the electric motor 4 is a three-phase synchronous electric motor.

The driving device has an electric power converter 1. In the example shown in FIG. 3, the electric power converter 1 has six switching elements, such as insulated gate bipolar transistors (IGBTs) 2, etc. In the electric power converter 1, a so-called inverter circuit is configured through connecting six IGBTs 2 by three-phase bridge connections. In each IGBT 2, a reflux diode 3 is connected between a collector and an emitter. Each reflux diode 3 is connected in parallel with respect to a corresponding IGBT 2. The electric power converter 1 is supplied with D/C power from a D/C power supply Vdc, which is a driving electric power source. Each of the output terminals (three-phase output terminals) of the electric power converter 1 is connected to a corresponding stator winding, of which there are three (three-phase stator windings) of the electric motor 4.

The driving device includes a rotation speed calculator 7, a voltage controller 8, a phase adjuster 9, and a peak value detector 10. In an example, the rotation speed calculator 7, the voltage controller 8, the phase adjuster 9, and the peak value detector 10 are provided in the integrated circuit 12 installed on a microcomputer, etc. In this case, the integrated circuit 12 has a processor and a storage medium, etc., and the processor includes a CPU (central processing unit), an ASIC (application specific integrated circuit), or an FPGA (field programmable gate array), etc. The integrated circuit 12 including the processor performs processing (to be later described) by executing a program, etc. stored in the storage medium, etc. As will be described later, it is also possible to configure the driving device of the present embodiment as the integrated circuit 12 consisting of the rotation speed calculator 7, the voltage controller 8, the phase adjuster 9, and the peak value detector 10, and not to include the electric power converter 1, the rotor position detector 5, the current detector 6, and the operation command setter 11 in the driving device. In this case, the driving system can be configured as the electric power converter 1, the electric motor 4, the rotor position detector 5, the current detector 6, the operation command setter 11, and the driving device, and the driving device includes the rotation speed calculator 7, the voltage controller 8, the phase adjuster 9, and the peak value detector 10.

The voltage controller 8 causes the electric power converter 1 to supply A/C power to the electric motor 4 by transmitting a command to the electric power converter 1. Upon receipt of the command from the voltage controller 8, the electric power converter 1 converts the power input from the D/C power source Vdc into three-phase A/C power having desired voltage and frequency. The electric power converter 1 then supplies the converted three-phase A/C power to the electric motor 4. Thus, for example, a three-phase A/C voltage with a pseudo-sine wave is output from the electric power converter 1, and the output three-phase A/C voltage is applied to the electric motor 4 as the drive voltage V. Upon the application of the drive voltage V to the electric motor 4, the electric motor 4 rotates. The voltage controller 8 controls the drive voltage V and controls the rotation of the electric motor 4 by controlling the operation of the electric power converter 1.

The voltage controller 8 generates a command relating to on/off timing of the IGBTs 2 which serve as switching elements. At this time, the voltage controller 8 generates a pattern of a pulse signal that controls the on/off timing of the IGBTs 2. A three-phase pulse width modulation (PWM) signal is an example of the pulse signal that controls the on/off timing of the IGBTs 2. The voltage controller 8 controls the on/off timing of the IGBTs 2 based on the generated pulse signal pattern, and controls the drive voltage V applied to the electric motor 4. If the duty ratio D of the pulse signal generated by the voltage controller 8, namely the duty ratio D of the command relating to the on/off timing of the IGBTs 2 changes, the on/off timing of the IGBTs 2 also changes.

The driving device includes a current detector 6. The current detector 6 detects a current flowing in the electric motor 4. The current detector 6 detects a current I for one or more phases of the electric motor 4. The current detector 6 includes a shunt resistor or a current sensor, etc. As an example where the current detector 6 includes a shunt resistor, a one-shunt method in which a shunt resistor is arranged at a single location on a power source line of the negative side (ground side) of the electric power converter 1 is known. It is also possible to adopt a three-shunt method in which each of shunt resistors is arranged between the emitter of corresponding one of three IGBTs 2 on the negative side (ground side) and the power source line of the negative side in the electric power converter 1, thereby arranging the shut resistors in three locations The driving device has a rotor position detector 5. The rotor position detector 5 detects a position (rotation position) of the rotor of the electric motor 4. In an example, the rotor position detector 5 includes a rotary encoder or a Hall sensor, etc. that can be attached to the electric motor 4, and detects a position of the rotor from the output of the rotary encoder or the Hall sensor, etc. The phase of the three-phase induced voltage E generated in the electric motor 4 is detected by detecting the position of the rotor. For this reason, the rotor position detector detects an output signal of the rotary encoder or the Hall sensor that is synchronized with the phase of the induced voltage E of the electric motor 4. The information relating to the position of the rotor is transmitted from the rotor position detector 5 to the voltage controller 8. The voltage controller 8 generates the above-described pulse signal, etc. based on the information relating to the position of the rotor, and controls the operation of the electric power converter 1.

The rotor position detector 5 may adopt a so-called sensor-less method in which a sensor is not provided. In one example, the rotor position detector 5 directly detects the induced voltage E of the electric motor 4, and detects the position of the rotor based on the phase, etc. of the induced voltage E. In another example, the rotor position detector 5 obtains, from the current detector 6, information relating to the current I flowing in the electric motor 4. Using the operation status of the electric motor 4 (e.g., the current I) and a fixed constant, etc., the rotor position detector 5 estimates the position of the rotor. If the rotor position detector 5 adopts the sensor-less method, the rotor position detector 5 may be installed in the integrated circuit 12, along with the rotation speed calculator 7, the voltage controller 8, the phase adjuster 9, and the peak value detector 10.

The driving system has an operation command setter 11. The operation command setter 11 includes a user interface, for example, and a command relating to the operation of the electric motor 4 is set by a user etc. via the operation command setter 11. The command set in the operation command setter 11 is transmitted to the voltage controller 8. In one example, the duty cycle D of the above-described pulse signal is set by the operation command setter 11, and the set duty ratio D is transmitted to the voltage controller 8. The voltage controller 8 generates the above-described pulse signal at the set duty ratio D. Examples of the user interface provided in the operation command setter 11 are a touch panel, an operation button, and a remote controller.

To the rotation speed calculator 7 provided as a parameter setter, information relating to the position of the rotor of the electric motor 4 detected in the rotor position detector 5 is transmitted. The rotation speed calculator 7 performs arithmetic and estimation operations to obtain the rotation angular velocity (rotation speed) ω of the rotor of the electric motor 4 as speed information of the electric motor 4, based on the information relating to the position of the rotor.

The current detector 6 includes an A/D converter, and converts an analog signal relating to the detected current into a digital signal by the A/D converter. Then, the current detector 6 transmits the digital signal indicating the information relating to the current I flowing in the electric motor 4 to the peak value detector 10.

The peak value detector 10 includes a peak hold circuit. The peak value detector 10 detects, from the information relating to the current I, a zero cross at which the current (A/C) I switches from positive to negative, or a zero cross at which the current I switches from negative to positive. Then the peak value detector 10 identifies the start and end of a cycle of the current I based on the detected zero cross. The peak value detector detects a peak value Ip of the current I in a single cycle. The peak value detector 10 detects the peak value Ip for each cycle.

The phase adjuster 9 receives the rotation angular velocity ω calculated by the rotation speed calculator 7, and the peak Ip of the current I detected by the peak value detector 10. The phase adjuster 9 adjusts a phase of the drive voltage V applied to the electric motor 4 based on the rotation angular velocity ω and the peak value Ip. The phase adjuster 9 then transmits a result of the adjustment of the phase of the drive voltage V to the voltage controller 8, and the voltage controller 8 controls the phase of the drive voltage V based on a result of the adjustment at the phase adjuster 9. By controlling the phase of the drive control V, the phase difference θ of the current I with respect to the induced voltage E is controlled, as described in the above with reference to FIGS. 1 and 2, etc.

In an example, the phase adjuster 9 transmits, to the voltage controller 8, a command relating to a phase shift amount of the drive voltage V as of the current point. Then, the voltage controller 8 corrects the phase of the foregoing pulse signal based on the command relating to the phase shift amount, and controls the phase of the drive voltage V. In the present embodiment, the phase adjuster 9 sets a ratio of the peak value Ip of the current I with respect to the rotation angular velocity ω as an index ε. Then, the phase adjuster 9 adjusts the phase of the drive voltage V in such a manner that the index ε becomes smaller (minimized). Herein, the index ε is similar to that shown in the foregoing expression (5). The index ε is an index calculated based on the speed information of the electric motor 4, such as the rotation angular velocity ω, and the current I.

Figure 4:
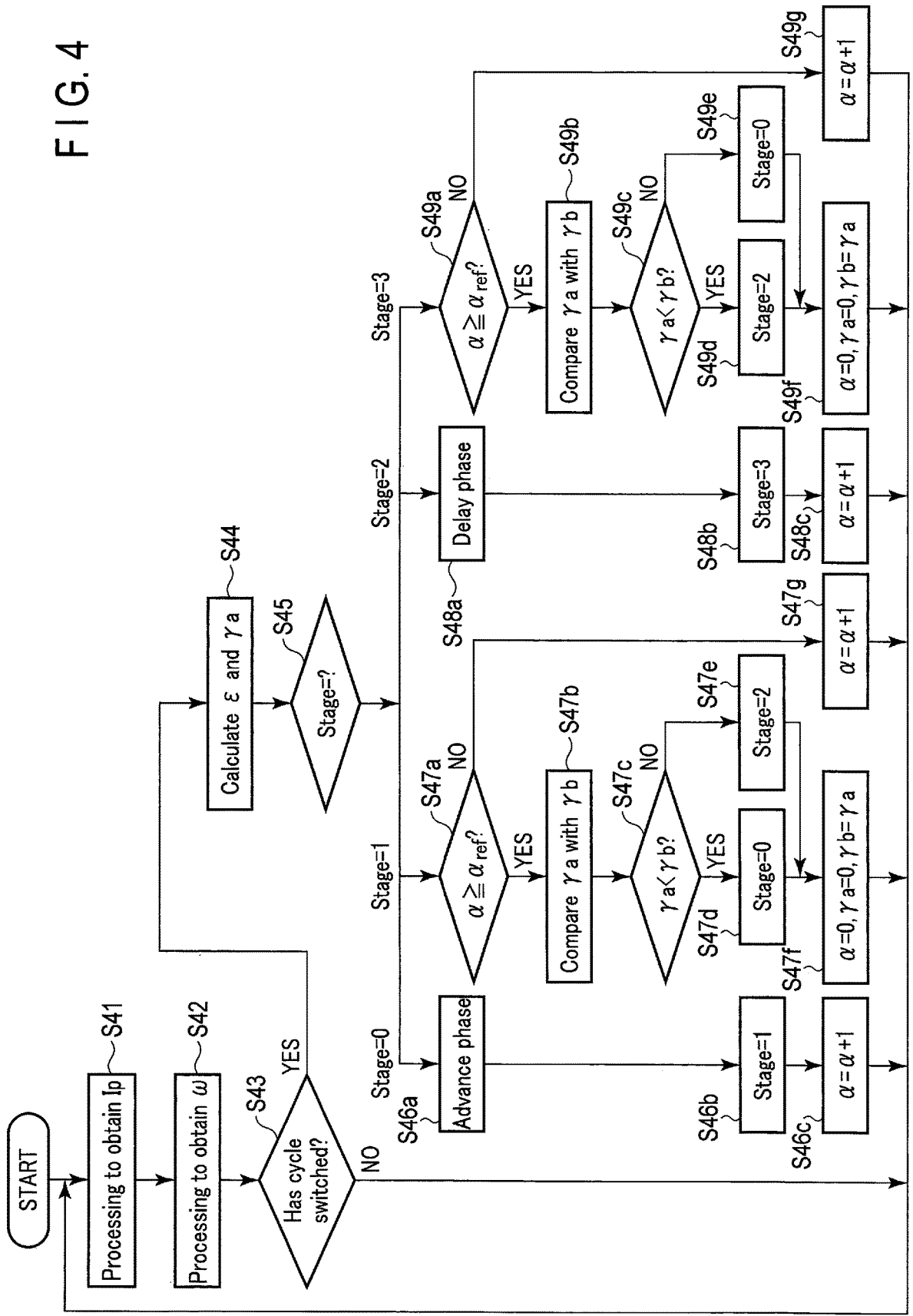
FIG. 4 is a flow chart showing a process performed by the driving device according to the first embodiment.

FIG. 4 is a flow chart showing a process performed by the driving device including the phase adjuster 9. The processing shown in FIG. 4 is continuously performed while the electric motor 4 is being driven. As shown in FIG. 4, the phase adjuster 9 performs processing to obtain the peak value Ip of the current (A/C) I flowing in the electric motor 4, based on detection results, etc. obtained at the current detector 6 and the peak value detector 10 (step S41). The phase adjuster 9 performs processing to obtain the rotation angular velocity (rotation speed) ω of the electric motor 4 based on calculation results, etc. at the rotation speed calculator 7 (step S42). The phase adjuster 9 determines whether or not the current (A/C) I is switched to a next cycle based on identification results, etc. of the start and end of a single cycle of the current I, which is obtained by the peak value detector 10 (step S43). In other words, in step S43, it is determined whether or not a single cycle of the current I finishes.

If the current I has not yet switched to a next cycle (No in step S43), the processing does not proceed to step S44, and continues the processing in step S41 through step S43. The phase adjuster 9 obtains the peak value Ip of the current I and the rotation angular velocity ω of the electric motor 4 per cycle of the current I, through the processing in step S41 through step S43. If the current I has already switched to a next cycle (Yes in step S43), the processing proceeds to step S44, and the processing in step S44 and thereafter is subsequently performed. The processing in step S44 and thereafter is performed every time the cycle of the current I switches, namely per cycle of the current I.

The phase adjuster 9 then calculates the index ε from the peak value Ip and the rotation angular velocity ω, and calculates the integrated value γa of the index ε (step S44). Herein, the integrated value γa is reset to zero for every $\alpha_{ref}$ cycles of the current I through the processing in step S47f or step S49f, which will be later described. Herein, $\alpha_{ref}$ref is an integer not less than 2. Thus, the integrated value γa is reset to zero for every multiple cycle of the current I. The integrated value $\gamma a_{(n)}$ at a n-th cycle can be written as the expression (6) below. The expression (6) shows the peak value Ip and the rotation angular velocity ω obtained in the n-th cycle, the index ε(n) in the n-th cycle, and the integrated value $\gamma a_{(n-1)}$ in the (n-1) cycle.

$$\gamma a_{(n)} = \gamma a_{(n-1)} + \varepsilon_{(n)} = \gamma a_{(n-1)} + \frac{I_p}{\omega} \quad (6)$$

The phase adjuster 9 determines a stage of the status of the phase adjustment of the drive voltage V (step S45). The stage has, for example, four states, 0, 1, 2, and 3. In the first determination in step S45, the stage is determined to be 0, for example. If the stage indicating the phase adjustment status is 0 ("stage=0" in step S45), the phase adjuster 9 advances the phase of the drive voltage V by the predetermined phase shift amount (step S46a). Then, the phase adjuster 9 sets the stage indicating the status of the phase adjustment of the drive voltage V to 1 (step S46b). The phase adjuster 9 adds 1 to the count value α (step S46c). The count value α indicates how many cycles of the current I have passed since the last comparison using the integrated value γa in the processing in step S47b or S49b (which will be later described). The count value α is then reset to zero for every $\alpha_{ref}$ cycles of the current I by the processing in step S47f or S49f (which will be later described), and is reset to zero at the same cycle in which the integrated value γa is reset to zero. The processing then returns to step S41, and the processing in step S41 and thereafter is subsequently performed.

If the stage indicating the status of the phase adjustment is 1 ("stage=1" in step S45), the phase adjuster 9 determines whether or not the count value α is equal to or greater than the reference value $\alpha_{ref}$ (step S47a). The reference value $\alpha_{ref}$ is a value indicating for how many cycles the integrated value γa is reset to zero as a result of the processing in step S47f or S49f (which will be later described). The reference value $\alpha_{ref}$ corresponds to a value indicating in every number of cycles the comparison using the integrated value γa in the processing in step S47b or S49b (which will be later described) is performed. For this reason, in step S47a, it is determined whether or not $\alpha_{ref}$ or more cycles of the current I have passed since the last comparison using the integrated value γa in the processing in step S47b or S49b (which will be later described). If the count value α is smaller than the reference value $α_{ref}$ (No in step S47a), the phase adjuster 9 adds 1 to the count value α (step S47g). The phase adjuster sets the stage indicating the status of the phase adjustment of the drive voltage V to 1. The processing then returns to step S41, and the processing in step S41 and thereafter is subsequently performed.

On the other hand, if the count value α is equal to or greater than the reference value $α_{ref}$ (Yes in step S47a), in other words, if the $α_{ref}$ or more cycles of the current I have passed since the last comparison using the integrated value γa, the phase adjuster 9 compares the integrated value γa with the integrated value γb (step S47b). Herein, in the comparison stage in step S47b, etc., the integral value γa corresponds to an integrated value of the index ε between the last comparison and the current comparison in the processing in step S47b or S49b (which will be later described). The integrated value γb corresponds to the integrated value of the index ε between the second time before comparison and the last comparison in the processing in step S47b or step S49b (which will be later described). Accordingly, the integrated value γb corresponds to the value used as the integrated value γa in the last comparison. Furthermore, the phase adjuster 9 determines whether or not the current integrated value γa is smaller than the last integrated value γb as a result of the comparison between the integrated values γa and γb in step S47b (step S47c).

If the integrated value γa is smaller than the integrated value γb (Yes in step S47c), the phase adjuster sets the stage indicating the phase adjustment of the drive voltage V to 0 (step S47d). On the other hand, if the integrated value γa is equal to or greater than the integrated value γb (No in step S47c), the phase adjuster 9 sets the stage indicating the phase adjustment of the drive voltage V to 2 (step S47e). Then, in the processing in step S47d or S47e, the phase adjuster 9 resets the count value α and the integrated value γa to zero, and updates the integrated value γb to the value used as the integrated value γa in the current comparison in step S47b (step S47f). Accordingly, after the comparison between the integrated values γa and γb is performed in step S47b, the processing in step S47f is performed within the same cycle as that of the comparison, so as to reset the count value α and the integrated value γa to zero, and to update the integrated value γb to the value used as the integrated value γa in step S47b. The processing then returns to step S41, and the processing in step S41 and thereafter is subsequently performed.

If the stage indicating the phase adjustment status is 2 ("stage=2" in step S45), the phase adjuster 9 delays the phase of the drive voltage V by the predetermined phase shift amount (step S48a). Then, the phase adjuster 9 sets the stage indicating the status of the phase adjustment of the drive voltage V to 3 (step S48b). The phase adjuster 9 adds 1 to the count value α (step S48c). The processing then returns to step S41, and the processing in step S41 and thereafter is subsequently performed.

If the stage indicating the status of the phase adjustment is 3 ("stage=3" in step S45), the phase adjuster 9 determines whether or not the count value α is equal to or greater than the reference value $α_{ref}$ (step S49a). If the count value α is smaller than the reference value $α_{ref}$ (No in step S49a), the phase adjuster 9 adds 1 to the count value α (step S49g). The phase adjuster 9 sets the stage indicating the status of the phase adjustment of the drive voltage V to 3. The processing then returns to step S41, and the processing in step S41 and thereafter is subsequently performed.

On the other hand, if the count value α is equal to or greater than the reference value $α_{ref}$ (Yes in step S49a), in other words, if the $α_{ref}$ or more cycles of the current I have passed since the last comparison using the integrated value γa, the phase adjuster 9 compares the integrated value γa with the integrated value γb (step S49b), similarly to the processing in step S47. Furthermore, the phase adjuster 9 determines whether or not the current integrated value γa is smaller than the last integrated value γb as a result of the comparison between the integrated values γa and γb in step S49b (step S49c).

If the integrated value γa is smaller than the integrated value γb (Yes in step S49c), the phase adjuster sets the stage indicating the phase adjustment of the drive voltage V to 2 (step S49d). On the other hand, if the integrated value γa is equal to or greater than the integrated value γb (No in step S49c), the phase adjuster 9 sets the stage indicating the phase adjustment of the drive voltage V to 0 (step S49e). Then, in the processing in step S49d or S49e, the phase adjuster 9 resets the count value α and the integrated value γa to zero, and updates the integrated value γb to the value used as the integrated value γa in the current comparison in step S49b (step S49f). Accordingly, if the comparison between the integrated values γa and γb is performed in step S49b, the count value α and the integrated value γa are reset to zero by the processing step S49f in the same cycle as that in which the comparison was performed, and the integrated value γb is updated to the value used as the integrated value γa in step S49b. The processing then returns to step S41, and the processing in step S41 and thereafter is subsequently performed.

In the present embodiment, the above-described processing is performed. For this reason, when the current integrated value γa becomes smaller than the last integrated value γb as a result of advancing the phase of the drive voltage V, the processing for advancing the phase of the drive voltage V is continued. On the other hand, when the current integrated value γa becomes equal to or greater than the last integrated value γb as a result of advancing the phase of the drive voltage V, the processing is switched to the processing for delaying the phase of the drive voltage V. When the current integrated value γa becomes smaller than the last integrated value γb as a result of delaying the phase of the drive voltage V, the processing for delaying the phase of the drive voltage V is continued. On the other hand, when the current integrated value γa becomes equal to or greater than the last integrated value γb as a result of delaying the phase of the drive voltage V, the processing is switched to the processing for advancing the phase of the drive voltage V. Thus, in the present embodiment, the phase of the drive voltage V is adjusted in such a manner that the integrated value γa of the index ε in $α_{ref}$ cycles of the current becomes smaller (minimized), and the index ε also becomes smaller.

In the present embodiment, since the control to adjust the phase of the drive voltage V in such a manner that the index ε becomes smaller (minimized) as described above is appropriately performed, the phase difference θ of the current I with respect to the induced voltage E appropriately converges to zero, and cosθ appropriately converges to 1. Accordingly, since the above-described processing is performed, high efficiency of the electric motor 4 can be achieved even under a condition whereby the torque control and the speed control are not performed; in other words, the output torque $τ_M$ changes.

In the present embodiment, the integrated value γa of the index ε in $\alpha_{ref}$ cycles of the current I is obtained, and the integrated value γa is compared to the last integrated value γb. Accordingly, the comparison using the integrated value γa is performed for every $\alpha_{ref}$ cycles of the current I. Thus, stability in an actual machine operation can be ensured.

In the present embodiment, the index ε is a ratio of the peak value Ip of the current I with respect to the rotation angular velocity (rotation speed) ω, and is calculated without using the output torque $\tau_M$ of the electric motor 4. Thus, through the foregoing processing, even when the output torque $\tau_M$ cannot be obtained, high efficiency of the electric motor 4 is achieved.

Second Embodiment

Figure 5:
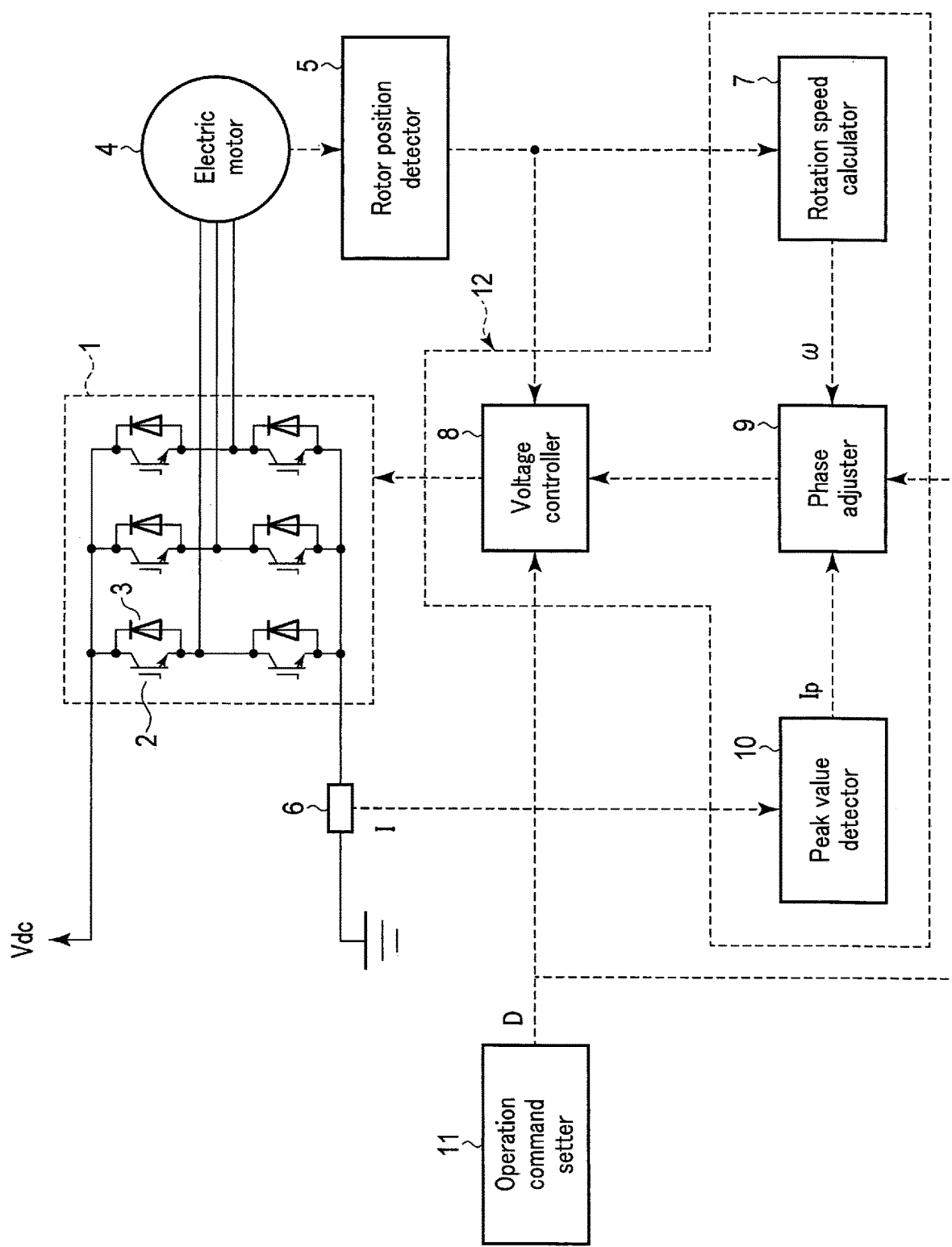
FIG. 5 is a schematic diagram showing an example of a driving device and a driving system according to a second embodiment.

FIG. 5 is a schematic diagram showing an example of a driving device and a driving system according to the second embodiment. The driving system of the second embodiment is basically the same as that of the first embodiment. In the present embodiment, however, the information relating to the duty cycle D set in the operation command setter 11 is transmitted not only to the voltage controller 8 but also to the phase adjuster 9.

Furthermore, in the present embodiment, the index εb shown in the expression (7) is calculated, instead of the index ε. As shown in the expression (7), the index εb is obtained by calculating a ratio of the peak value Ip of the current I with respect to the rotation angular velocity (rotation speed) ω and multiplying the ratio with the duty ratio D of the command relating to the on/off timing of the IGBTs (switching elements) 2.

$$\varepsilon b = D \cdot \frac{Ip}{\omega} \quad (7)$$

In the present embodiment, processing essentially the same as that in the first embodiment (as shown in FIG. 4) is performed. In the present embodiment, the index εb is calculated in step S44. Similarly to the integrated value γa of the index εa, an integrated value γc of the index εb is also calculated. The integrated value γd is defined in a manner similar to the definition of the integrated value Γb. In the present embodiment, the integrated values γc and γd of the index value εb are compared, similarly to the comparison of the integrated values γa and γb of the index value ε. Similarly to the first embodiment, the phase of the drive voltage V is adjusted based on a comparison result of the integrated values γc and γd of the index value εb. Thus, also in the present embodiment, the phase of the drive voltage V is adjusted in such a manner that the integrated value γc of the index εb in $\alpha_{ref}$ cycles of the current I becomes smaller (minimized), and the index εb also becomes smaller.

Furthermore, the index εb is calculated using speed information of the electric motor 4, such as the rotation angular velocity (rotation speed) ω, etc. of the electric motor 4, and the current I flowing in the electric motor 4. Then, the phase of the drive voltage V is adjusted in such a manner that the index εb becomes smaller. Thus, high efficiency of the electric motor 4 is achieved in the present embodiment as well as in the first embodiment, etc.

In the present embodiment, a parameter obtained by multiplying the ratio of the current I with respect to the rotation angular velocity ω with the duty ratio D is used as the index εb. For this reason, even when the duty ratio D is changed as appropriate to correspond to the load torque $\tau_L$ of the electric motor 4, high efficiency of the electric motor 4 can be achieved as appropriate through the adjustment of the phase of the drive voltage V in such a manner that the index εb becomes smaller.

Third Embodiment

In the driving device and the driving system described in the third embodiment, a speed inverse calculator is provided as a parameter setter, instead of the rotation speed calculator 7. The speed inverse calculator sets, as the speed information of the electric motor 4, a parameter corresponding to a time which is an inverse of the rotation angular velocity (rotation speed) ω by performing arithmetic and estimation operations. In the present embodiment, the speed inverse calculator sets a count value N as a parameter corresponding to a time which is an inverse of the rotation angular velocity (rotation speed) ω by performing arithmetic and estimation operations.

Herein, the inverse of the rotation angular velocity ω corresponds to elapsed time required for a movement of the rotor of the electric motor 4 in a given section. In a measurement of this elapsed time, to determine the elapsed time, generally, the count value N is multiplied with a fixed control processing interval Ta in a microcomputer, etc. having the above-described integrated circuit 12. Accordingly, the count value N calculated by the speed inverse calculator can be expressed with the use of the rotation angular velocity ω and the control processing interval Ta, as shown in the expression (8).

$$N \cong \frac{2\pi}{Ta} \cdot \frac{1}{\omega} \quad (8)$$

Accordingly, the index ε used in the first embodiment, etc., namely, the ratio of the current I with respect to the rotation angular velocity can be transformed as shown in the expression (9).

$$\varepsilon = \frac{I}{\omega} = \frac{Ta}{2\pi} \cdot I \cdot N \propto I \cdot N \quad (9)$$

Accordingly, the index ε used in the first embodiment, etc. can be calculated using a count value N, instead of the rotation angular velocity ω. In the present embodiment, the phase adjuster 9 obtains, instead of the rotation angular velocity ω, the count value N as a parameter corresponding to a time which is an inverse of the rotation angular velocity ω, and calculates the index ε using the count value N and the current I. Furthermore, in the present embodiment, the index ε is calculated using a value obtained by multiplying the current I with the count value N.

In the present embodiment, since the index ε is calculated as described above, the index ε can be calculated without performing division. Generally, division requires a great amount of arithmetic operation compared to addition, subtraction, and multiplication, etc., and a configuration, etc. of an arithmetic circuit therefore tends to be complicated. In the present embodiment, as division is not performed to calculate the index ε, an amount of calculation processing in the driving device can thereby be reduced, and a configuration, etc. of an arithmetic circuit can be simplified.

Modifications

In the above-described embodiment, etc., three-phase A/C power is supplied from the electric power converter 1 to the electric motor 4; however, the above-described driving control is also applicable to both the case where single-phase A/C power is supplied to the electric motor 4 and the case where two-phase A/C power is supplied to the electric motor 4.

The above-described embodiment, etc. is described on the assumption that the driving device includes the electric power converter 1, the rotor position detector 5, the current detector 6, and the operation command setter 11; however, the driving device may be realized without including these elements.

In this case, the parameter setter (for example, the rotation speed calculator 7) that constitutes the driving device is configured in such a manner that the information relating to the position of the rotor can be input from the rotor position detector 5, etc. provided externally to the driving device. Similarly, the voltage controller 8 constituting the driving device is configured so as to be able to control the operation of the electric power converter 1, which is provided externally to the driving device, based on information relating to the position of the rotor detected by the rotor position detector 5, etc., which is provided externally to the driving device. Furthermore, the voltage controller 8 may be configured in such a manner that a command regarding the operation from the operation command setter 11, provided externally to the driving device, may be input to the voltage controller 8. The driving device in this case is configured in such a manner that the current I flowing in the electric motor 4 (including the current I itself and information thereof) can be input from the current detector 6, etc. provided externally to the driving device, which is provided with the peak value detector 10.

According to at least one of the foregoing embodiments and examples, the phase adjuster sets an index calculated using a current value and speed information, and adjusts a phase of a drive voltage in such a manner that the index becomes smaller. It is thereby possible to provide a driving device that achieves high efficiency of an electric motor with relatively simple processing even in such a case where torque control and speed control are not performed in the motor, for example. The speed information includes, for example, the rotation angular velocity ω and an inverse thereof (e.g., a count value N).

According to at least one of the foregoing embodiments and examples, in the adjustment of the phase of the drive voltage, an index calculated using a current value and speed information is set, and a phase of a drive voltage is adjusted in such a manner that the index becomes smaller. For this reason, even if the torque control and the speed control of the electric motor are not performed for example, it is possible to provide a method of driving an electric motor that achieves high efficiency electric motor through relatively simple processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A driving device comprising:
   a voltage controller configured to cause an electric power converter to apply a drive voltage to an electric motor by controlling an operation of the electric power converter, the electric power converter being configured to convert input electric power into A/C electric power having desired voltage and frequency and configured to supply the converted electric power to the electric motor;
   a parameter setter configured to set at least one of a rotation speed of the electric motor and a parameter related to the rotation speed as speed information; and
   a phase adjuster configured to periodically calculate an index based on a current flowing in the electric motor and the speed information set in the parameter setter and to adjust a phase of the drive voltage applied to the electric motor by the voltage controller in such a manner that the calculated index becomes smaller every time the index is calculated, the index depending on both the current flowing in the electric motor and the rotation speed of the electric motor and being different from the phase of the drive voltage,
   the phase adjuster further configured to judge whether the phase of the drive voltage applied to the electric motor should be advanced or delayed based on the calculated index and to advance or delay the phase of the drive voltage by a predetermined phase shift amount based on a result of the judgement.

2. The driving device according to claim 1, wherein
   the parameter setter calculates the rotation speed of the electric motor as the speed information, and
   the phase adjuster sets a ratio of the current with respect to the rotation speed as the index.

3. The driving device according to claim 1, wherein
   the electric power converter includes a switching element,
   the voltage controller controls the drive voltage applied to the electric motor by controlling on/off timing of the switching element of the electric power converter,
   the parameter setter calculates the rotation speed of the electric motor as the speed information, and
   the phase adjuster sets, as the index, a value obtained by multiplying the ratio of the current with respect to the rotation speed with a duty ratio of a command relating to the on/off timing of the switching element.

4. The driving device according to claim 1, wherein
   the parameter setter calculates a parameter corresponding to a time which is an inverse of the rotation speed as the speed information, and
   the phase adjuster sets the index using a value obtained by multiplying the current with the parameter corresponding to the time.

5. The driving device according to claim 1, comprising an integrated circuit in which the voltage controller, the parameter setter, and the phase adjuster are installed.

6. A driving system comprising:
   the driving device according to claim 1;
   the electric power converter; and
   an electric motor to which the drive voltage is applied by the electric power converter.

7. The driving device according to claim 1, further comprising:
   a position detector configured to detect a position of a rotor of the electric motor based on at least one of an output of a sensor, a detected result of an induced voltage of the electric motor and a detected result of the current flowing in the electric motor.

8. The driving device according to claim 1, wherein the phase adjuster is configured to control a phase difference of the current flowing in the electric motor with respect to an induced voltage of the electric motor by adjusting the phase of the drive voltage.

9. A method of driving an electric motor, the method comprising:
  converting input electric power into A/C electric power having desired voltage and frequency by an electric power converter, and supplying the converted electric A/C power to the electric motor;
  detecting a current flowing in the electric motor;
  setting at least one of a rotation speed of the electric motor and a parameter related to the rotation speed as speed information;
  periodically calculating an index based on the detected current flowing in the electric motor and the set speed information, the index depending on both the current flowing in the electric motor and the rotation speed of the electric motor and being different from the phase of the drive voltage; and
  adjusting a phase of a drive voltage applied to the electric motor from the electric power converter in such a manner that the calculated index becomes smaller every time the index is calculated, including,
  judging whether the phase of the drive voltage applied to the electric motor should be advanced or delayed based on the calculated index, and
  advancing or delaying the phase of the drive voltage by a predetermined phase shift amount based on a result of the judging.

* * * * *